United States Patent
Karjala et al.

(10) Patent No.: US 10,336,893 B2
(45) Date of Patent: Jul. 2, 2019

(54) PROCESS FOR PREPARING A MODIFIED ETHYLENE-BASED POLYMER USING A HYDROCARBON INITIATOR

(71) Applicant: Dow Global Technologies LLC, Midland, MI (US)

(72) Inventors: Teresa Karjala, Lake Jackson, TX (US); Sean Ewart, Pearland, TX (US); Mehmet Demirors, Pearland, TX (US); Nicolas C. Mazzola, Jundiai (BR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/531,649

(22) PCT Filed: Dec. 18, 2015

(86) PCT No.: PCT/US2015/066592
§ 371 (c)(1),
(2) Date: May 30, 2017

(87) PCT Pub. No.: WO2016/106117
PCT Pub. Date: Jun. 30, 2016

(65) Prior Publication Data
US 2017/0362419 A1    Dec. 21, 2017

Related U.S. Application Data

(60) Provisional application No. 62/095,846, filed on Dec. 23, 2014.

(51) Int. Cl.
*C08L 23/06* (2006.01)
*C08L 23/08* (2006.01)
*C08L 23/26* (2006.01)

(52) U.S. Cl.
CPC ......... *C08L 23/0815* (2013.01); *C08L 23/06* (2013.01); *C08L 2023/42* (2013.01)

(58) Field of Classification Search
CPC ... C08L 23/0815; C08L 23/06; C08L 2023/42
USPC ...................................................... 524/323
See application file for complete search history.

(56) References Cited

U.S. PATENT DOCUMENTS

| | | |
|---|---|---|
| 4,390,666 A | 6/1983 | Morigucho et al. |
| 4,578,431 A | 3/1986 | Shaw et al. |
| 4,603,173 A | 7/1986 | Mack et al. |
| 4,737,547 A | 4/1988 | White |
| 5,268,440 A | 12/1993 | Luft et al. |
| 5,486,575 A | 1/1996 | Shroff |
| 6,706,822 B2 | 3/2004 | Guenther et al. |
| 6,951,904 B1 | 10/2005 | Peeters et al. |
| 6,967,229 B2 | 11/2005 | Voorheis |
| 8,653,196 B2 | 2/2014 | Mazzola et al. |
| 2002/0115796 A1 | 8/2002 | Walton |
| 2006/0047049 A1 | 3/2006 | Onishi et al. |
| 2010/0108357 A1 | 5/2010 | Smedberg et al. |

FOREIGN PATENT DOCUMENTS

| | | |
|---|---|---|
| DE | 3642266 A1 | 4/1987 |
| WO | 96/31563 A1 | 10/1996 |
| WO | 2012/074812 A1 | 6/2012 |
| WO | 2012/096962 A1 | 7/2012 |

OTHER PUBLICATIONS

English Language Machine Translation of DE 3642266 (Year: 1987).*
Williams, T. et al., J. Polym. Sci., Polymer Letters, vol. 6, pp. 621-624, 1968.

* cited by examiner

*Primary Examiner* — Angela C Scott
(74) *Attorney, Agent, or Firm* — Husch Blackwell LLP

(57) ABSTRACT

The invention provides a process to form a second composition comprising a modified ethylene-based polymer, the process comprising the step of contacting under thermal treatment conditions a first composition comprising a first ethylene-based polymer, and the following: (A) at least one carbon-carbon (C—C) free radical initiator; and (B) at least one free radical initiator other than a C—C free radical initiator of (A) (a non-C—C free radical initiator). The melt strength of the second composition is typically at least 15% or greater than the melt strength of the first composition. The second composition typically has a gel content less than or equal to 40.

20 Claims, No Drawings

US 10,336,893 B2

PROCESS FOR PREPARING A MODIFIED ETHYLENE-BASED POLYMER USING A HYDROCARBON INITIATOR

REFERENCE TO RELATED APPLICATIONS

The present application claims the benefit of U.S. Provisional Application No. 62/095,846, filed Dec. 23, 2014, incorporated herein by reference.

FIELD OF THE INVENTION

This invention relates to ethylene-based polymers. In one aspect the invention relates to increasing the melt strength of an ethylene-based polymer, particularly a high melt strength polyethylene, during reactive extrusion. In another aspect the invention relates to a process of increasing the melt strength of an ethylene-based polymer while minimizing gel formation.

BACKGROUND OF THE INVENTION

Polyethylene has desirable properties that have helped to make it the highest volume polymer manufactured. Polyethylene can be made in different processes in order to give different properties. Known families of polyethylene include high density polyethylene (HDPE), linear low density polyethylene (LLDPE), and low density polyethylene made using high pressure reactors (LDPE). Within these broad classes many variations exist resulting from different types of reactors (for example, solution, slurry, gas phase or high pressure reactors) or from the use of different catalysts (for example, Ziegler-Natta, constrained geometry, metallocene, and bis-biphenylphenoxy type catalysts). The desired application requires a careful balance of rheological properties which will lead a person of skill in the art to select one type of polyethylene over another. In many applications, such as blow-molding and blown film applications, melt strength of the polyethylene is a key parameter.

The melt strength is a practical measurement that can predict material performance when submitted to elongational deformations. In melt processing good elongational viscosity is important to maintain stability during processes such as coating, blown film production, fiber spinning and foamed parts. The melt strength is related to the number of molecular entanglements of molten polymers and relaxation times of each molecular structure, which is basically dependent on the overall molecular weight and the number of long-chain branches in relation to the critical molecular weight.

Melt strength directly affects several processing parameters such as bubble stability and therefore thickness variation during blown film production; parison formation during the blow molding process; sagging during profile extrusion; cell formation during the foaming process; more stable thickness distribution during sheet/film thermoforming.

This property can be enhanced by using resins with higher molecular weight, but such resins will generally require more robust equipment and more energy use because they tend to generate higher extrusion pressure during the extrusion process. Therefore, properties must be balanced to provide an acceptable combination of physical properties and processability.

The use of highly long-chain branched polymers such as LDPE to increase melt strength or a specific catalyst system that incorporates a high level of long-chain branching into the polyethylene are other alternatives to enhance material processability during extrusion. However, while some properties are improved, high levels of long-chain branching can hurt other properties.

Currently, when increased melt strength is desired, the most common approach is to include peroxides to crosslink the polyethylene. For example, U.S. Pat. No. 5,486,575 improves the properties of a polyethylene resin prepared from a chromium catalyst by using an organic peroxide. U.S. Pat. Nos. 4,390,666 and 4,603,173 use peroxides to crosslink a polyethylene blend containing high and low molecular weight components. U.S. Pat. No. 6,706,822 uses peroxides with polyethylene having a broad molecular weight distribution to reduce melt swell. U.S. Pat. No. 5,486,575 uses peroxides with polyethylene prepared with chromium catalysts. While some properties can be improved by crosslinking with peroxides, there are issues with this approach. The radicals produced can interact deleteriously with other additives. It is difficult to predict the effect of crosslinking on rheological properties. Reported results vary significantly from resin to resin, even when the resins are produced using similar catalyst technologies. Peroxides add an extra component to the composition, and they require careful handling and storage, which adds to the cost.

Moreover, if the crosslinking begins too early in the process, gels will form and these will be carried forward into the final product. Gels are generally undesired for various reasons, including deleterious effects on mechanical and electrical properties and diminished aesthetics, and are generally avoided or at least minimized to the extent possible. In reactive extrusion the desire is to postpone or delay the onset of crosslinking until the initiator is thoroughly admixed with the polymer and the polymer is ready for extrusion.

SUMMARY OF THE INVENTION

In one embodiment the invention is a process to form a second composition comprising a modified ethylene-based polymer, the process comprising reacting a first composition comprising a first ethylene-based polymer with at least the following:
 (A) at least one carbon-carbon (C—C) free radical initiator of Structure I:

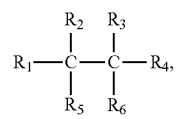

(Structure I)

wherein $R_1$, $R_2$, $R_3$, $R_4$, $R_5$ and $R_6$ are each, independently, hydrogen or a hydrocarbyl group; and
 wherein, optionally, two or more R groups ($R_1$, $R_2$, $R_3$, $R_4$, $R_5$ and $R_6$) form a ring structure; and
 with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and
 (B) at least one free radical initiator other than the carbon-carbon (C—C) free radical initiator of Structure I (a non-C—C free radical initiator); and
 (C) less than 10 ppm of a hindered phenol antioxidant, based on the weight of the first composition.

The invention also provides a process to form a second composition comprising a modified ethylene-based polymer the process comprising reacting a first composition comprising a first ethylene-based polymer with at least the following:
(A) at least one carbon-carbon (C—C) free radical initiator of Structure I:

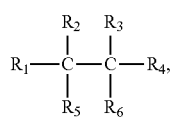

(Structure I)

wherein $R_1$, $R_2$, $R_3$, $R_4$, $R_5$ and $R_6$ are each, independently, hydrogen or a hydrocarbyl group; and
wherein, optionally, two or more R groups ($R_1$, $R_2$, $R_3$, $R_4$, $R_5$ and $R_6$) form a ring structure; and
with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and
(B) at least one free radical initiator other than the carbon-carbon (C—C) free radical initiator of Structure I (a non-C—C free radical initiator).

In one embodiment the invention is an ethylene-based polymer made by the process of this invention.

DETAILED DESCRIPTION OF THE PREFERRED EMBODIMENT

In one embodiment the invention is a process comprising the step of contacting under thermal treatment conditions the ethylene-based polymer with at least the following:
(A) at least one carbon-carbon (C—C) free radical initiator of Structure I:

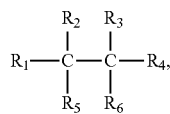

(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that (i) at least one of $R_2$ and $R_5$, and at least one of $R_3$ and $R_6$ is a hydrocarbyl group of at least two carbon atoms; and
(B) at least one non-C—C free radical initiator.

In an embodiment the at least one non-C—C free radical initiator is a peroxide.

In an embodiment the at least one non-C—C free radical initiator is a hydroxylamine ester such as CGX CR 946 available from BASF.

In one embodiment, the C—C free-radical initiator is present in an amount greater than, or equal to, 0.001 grams per kilogram (g/kg), further greater than 0.005 grams per kilogram, further greater than 0.008 grams per kilogram, further greater than 0.01 grams per kilogram, of the ethylene-based polymer.

In one embodiment, the non-C—C free-radical initiator is present in an amount greater than, or equal to, 0.001 grams per kilogram (g/kg), further greater than 0.005 grams per kilogram, further greater than 0.008 grams per kilogram, further greater than 0.01 grams per kilogram, of the ethylene-based polymer.

In one embodiment the C—C free radical initiator and non-C—C free radical initiator are typically present in the process of this invention at a C—C initiator to non-C—C initiator weight ratio from 0.10 to 0.60, more typically from 0.20 to 0.50 and even more typically from 0.30 to 0.40.

In one embodiment the total amount of free radical initiator used in the practice of this invention, i.e., the combined amount of all C—C free radical initiators and all non-C—C free radical initiators, is from greater than, or equal to, 0.002 grams per kilogram (g/kg) to not in excess of 2 g/kg, or from greater than 0.01 g/kg to not in excess of 0.2 g/kg, or from greater than 0.016 g/kg to not in excess of 0.1 g/kg of the ethylene-based polymer subjected to the thermal treatment and contacted with the free radical initiators of (A) and (B) above.

In one embodiment, the C—C free-radical initiator has a decomposition temperature of greater than or equal to ($\geq$)125° C., or $\geq$130° C., or $\geq$150° C., or $\geq$180° C., or $\geq$200° C., or $\geq$250° C., based on DSC measurements.

In one embodiment, the process comprises contacting the ethylene-based polymer with at least two C—C free-radical initiators.

In one embodiment, for Structure I, $R_1$ and $R_4$ are phenyl.

In one embodiment, for Structure I, the at least one C—C free radical initiator is selected from the group consisting of 3,4-diethyl-3,4-diphenyl hexane and 3,4-dipropyl-3,4-diphenyl hexane.

In one embodiment the ethylene-based polymer is a low density polyethylene (LDPE).

In one embodiment the ethylene-based polymer is a linear low density polyethylene (LLDPE).

In one embodiment, the melt index ($I_2$, 190° C./2.16 kg) of the ethylene-based polymer before thermal treatment and contact with the free radical initiators of (A) and (B) above is from 0.1-100 g/10 min, or from 0.5-50 g/10 min, or from 1-20 g/10 min.

In one embodiment, the ethylene-based polymer before thermal treatment and contact with the free radical initiators of (A) and (B) above has a density from 0.90 to 0.97 g/cc, preferably from 0.91 to 0.95 g/cc, more preferably from 0.914 to 0.935 g/cc.

In one embodiment, the ethylene-based polymer before thermal treatment and contact with the free radical initiators of (A) and (B) above has a molecular weight distribution determined by GPC from 1.5 to 20, or from 2.5 to 15, or from 3 to 10.

In one embodiment the ethylene-based polymer before thermal treatment and contact with the free radical initiators of (A) and (B) above comprises less than (<) 100 weight ppm oxygen, preferably <50 weight ppm oxygen and more preferably <1 weight ppm oxygen as determined by mass balance of oxygenated components added to the polymerization process.

In one embodiment the invention is a process combining two or more of the previous embodiments.

In one embodiment, the invention is a composition comprising the modified ethylene-based polymer made by the process of this invention.

In one embodiment, the invention is a composition comprising (i) a modified ethylene-based polymer made by the process of this invention, and (ii) one or more additives.

An inventive composition may comprise a combination of two or more embodiments as described herein.

In one embodiment the invention is a composition comprising the modified ethylene-based polymer of this invention.

In one embodiment the composition comprising the modified ethylene-based polymer of this invention also comprises one or more olefin-based polymers.

The invention also provides an article comprising at least one component formed from an inventive composition as described herein. In a further embodiment, the article is a film or a coating.

An inventive article may comprise a combination of two or more embodiments as described herein.

In one embodiment the melt strength of the second composition is at least 15%, or at least 20%, or at least 25% greater than the melt strength of the first composition (calculated by subtracting the melt strength of the first composition (MS1) from the melt strength of the second composition (MS2) and dividing the difference by the melt strength of the first composition (MS1) and then multiplying the quotient by 100, or ((MS2−MS1)/MS1))*100).

In one embodiment the second composition has a gel content less than or equal to 40, or less than or equal to 20, or less than or equal to 10, or less than or equal to 5 as determined by the GI200 test method with a film thickness of 76±5 microns.

In one embodiment the invention is a process for increasing the melt strength of an ethylene-based polymer by at least 15%, the process comprising the step of contacting under thermal treatment conditions the ethylene-based polymer with at least the following:
- (A) at least one carbon-carbon (C—C) free radical initiator; and
- (B) at least one free radical initiator other than a C—C free radical initiator of (A) (subsequently referred to as a "non-C—C free radical initiator"); and
- (C) less than 10 ppm of a hindered phenol antioxidant, based on the weight of the ethylene-based polymer.

C—C Free Radical Initiators

The carbon-carbon ("C—C") initiators used in the practice of this invention comprise only carbon and hydrogen, and have Structure I:

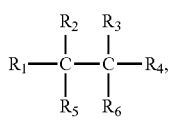
(Structure I)

wherein $R_1$, $R_2$, $R_3$, $R_4$, $R_5$ and $R_6$ are each, independently, hydrogen or a hydrocarbyl group and wherein, optionally, two or more R groups ($R_1$, $R_2$, $R_3$, $R_4$, $R_5$ and $R_6$) form a ring structure, with the provisos that at least one of $R_2$ and $R_5$, and at least one of $R_3$ and $R_6$ is a hydrocarbyl group of at least two carbon atoms.

In one embodiment, one or more of the $R_1$-$R_6$ groups are aliphatic.

In one embodiment, one or more of the $R_1$-$R_6$ groups are alkyl.

In one embodiment, one or more of the $R_1$-$R_6$ groups are aryl.

In one embodiment, two or more of the $R_1$-$R_6$ groups are aryl.

In one embodiment, $R_1$ and $R_4$ are aryl, preferably phenyl.

In one embodiment, $R_1$ and $R_4$ are aryl, and one of $R_2$ and $R_5$, and one of $R_3$ and $R_6$ is hydrogen.

In one embodiment, $R_1$ and $R_4$ are aryl, and one of $R_2$ and $R_5$ and one of $R_3$ and $R_6$ is a $C_2$-$C_{10}$ alkyl and the other of $R_2$ and $R_5$ and the other of $R_3$ and $R_6$ is hydrogen.

In one embodiment $R_1$ and $R_4$ are the same or different aryl radicals. In a further embodiment, $R_1$ and $R_4$ are each phenyl, e.g., Structure II; and wherein $R_2$, $R_3$, $R_5$ and $R_6$ are each as described above:

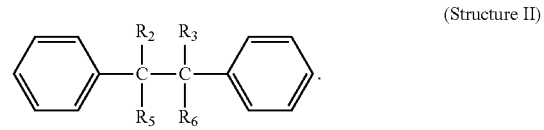
(Structure II)

In one embodiment, $R_2$-$R_3$ and $R_5$-$R_6$ are the same or different alkyl radicals, more preferably the same or different $C_{1-6}$ alkyl radicals, and even more preferably the same $C_{1-4}$ straight chain alkyl radical.

Representative C—C initiators include, but are not limited to, the following Structures III-VIII, as follows: 3,4-dimethyl-3,4-diphenyl hexane (Structure III)

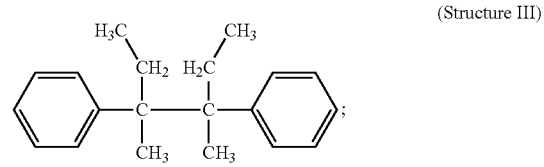 [SMILES: CCC(C)(c1ccccc1)C(C)(CC)c1ccccc1]
(Structure III)

and, 3,4-diethyl-3,4-diphenyl hexane (Structure IV)

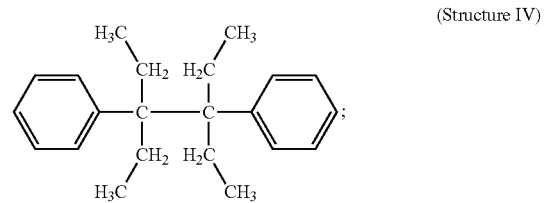 [SMILES: CCC(CC)(c1ccccc1)C(CC)(CC)c1ccccc1]
(Structure IV)

2,7-dimethyl-4,5diethyl-4,5-diphenyl octane (DBuDPH) (Structure V)

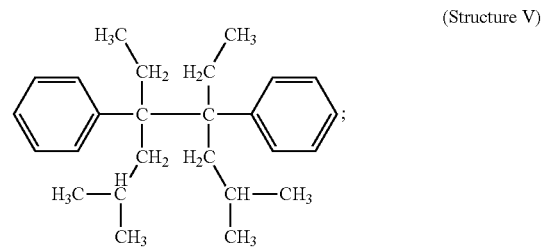 [SMILES: CCC(CC(C)C)(c1ccccc1)C(CC)(CC(C)C)c1ccccc1]
(Structure V)

3,4-dibenzyl-3,4-ditolyl hexane (DBnDTH) (Structure VI)

Structure VI

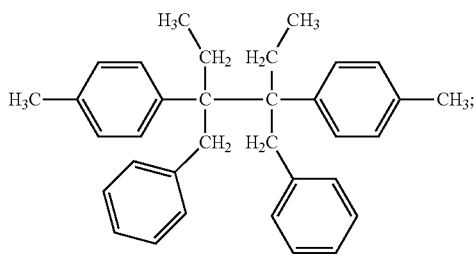

3,4-diethyl-3,4-di(dimethylphenyl) hexane (Structure VII)

Structure VII

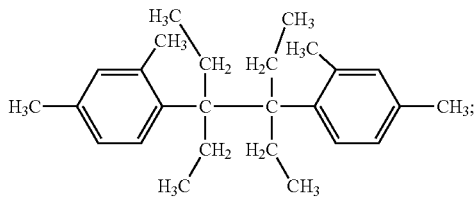

and, 3,4-dibenzyl-3,4-diphenyl hexane (Structure VIII)

Structure VIII

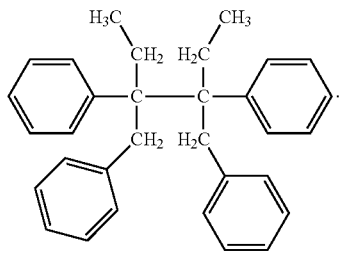

Other C—C initiators include those of Structure 1 and described in such publications as WO 2012/096962, WO 2012/074812, US 2010/0108357, EP 1 944 327, U.S. Pat. No. 5,268,440, U.S. Pat. No. 6,967,229 and US 2006/0047049. The C—C initiators can be used alone or in combination with one another.

The C—C free-radical initiator has a decomposition temperature of greater than or equal to (≥)125° C., or ≥130° C., or ≥150° C., or ≥180° C., or ≥200° C., or ≥250° C., based on DSC measurements.

In one embodiment, the C—C free-radical initiator is present in an amount greater than, or equal to, 0.001 grams per kilogram (g/kg), further greater than 0.005 g/kg, further greater than 0.008 g/kg, further greater than 0.01 g/kg, of the ethylene-based polymer subjected to the thermal treatment and contacted with the free radical initiators of (A) and (B) above. While the only limitation on the maximum amount of C—C initiator used in the practice of this invention is a function of process economics and efficiency, typically the maximum amount of C—C initiator used in the practice of this invention does not exceed 1 g/kg, more typically does not exceed 0.1 g/kg and even more typically does not exceed 0.05 g/kg, of the ethylene-based polymer subjected to the thermal treatment and contacted with the free radical initiators of (A) and (B) above.

In an embodiment, two or more C—C free radical initiators may be used in combination with one another. In those embodiments in which the C—C initiator is used in combination with one or more other C—C initiators, only one of the C—C initiators must have at least one of $R_2$ and $R_5$, and at least one of $R_3$ and $R_6$ as a hydrocarbyl group of at least two carbon atoms. In such embodiments, a C—C initiator of Structure I comprises at least 25 wt %, preferably at least 50 wt %, more preferably more than 50 wt % and even more preferably at least 75 wt %, of the total amount of C—C initiator used in the process.

Free Radical Initiators Other than C—C Free Radical Initiators (Non-C—C Free Radical Initiators)

The free radical initiators other than the C—C free radical initiators (i.e., non-C—C free radical initiators) include any compound or mixture of compounds that produce a free radical available for reacting with the ethylene-based polymers of this invention. These compounds include, but are not limited to, organic and inorganic peroxides, azo compounds, sulfur compounds, halogen compounds and sterically hindered hydroxylamine esters. Representative organic peroxides include 1,1-di-t-butyl peroxy-3,3,5-trimethylcyclohexane; dicumyl peroxide; 2,5-dimethyl-2,5-di(t-butyl peroxy) hexane; t-butyl-cumyl peroxide; di-t-butyl peroxide; and 2,5-dimethyl-2,5-di-(t-butyl peroxy) hexyne. In one embodiment the non-C—C free radical initiator is a sterically hindered hydroxylamine ester such as CGX CR 946 available from BASF. Additional teachings regarding organic peroxide initiators are available in the *Handbook of Polymer Foams and Technology*, pp. 198-204, edited by D. Klempner and K. C. Frisch, Hanser Publishers, Munich (1991). In an embodiment, two or more non-C—C free radical initiators may be used in combination with one another.

In one embodiment, the non-C—C free-radical initiator is present in an amount greater than, or equal to, 0.001 grams per kilogram (g/kg), further greater than 0.005 g/kg, further greater than 0.008 g/kg, further greater than 0.01 g/kg, of the ethylene-based polymer subjected to the thermal treatment and contacted with the free radical initiators of (A) and (B) above. While the only limitation on the maximum amount of non-C—C initiator used in the practice of this invention is a function of process economics and efficiency, typically the maximum amount of C—C initiator used in the practice of this invention does not exceed 1 g/kg, more typically does not exceed 0.1 g/kg and even more typically does not exceed 0.08 g/kg, of the ethylene-based polymer subjected to the thermal treatment and contacted with the free radical initiators of (A) and (B) above.

In one embodiment, the first composition comprises from 10 ppm, or 25 ppm, or 50 ppm, or 100 ppm, to 500 ppm, or 1,000 ppm, or 5,000 ppm, or 10,000 ppm of at least one peroxide (non C—C initiator), having a one-hour half-life decomposition temperature from 160° C. to 250° C.

In one embodiment, the first composition comprises from 10 ppm, or 25 ppm, or 50 ppm, or 100 ppm, to 500 ppm, or 1,000 ppm, or 5,000 ppm, or 10,000 ppm of at least one peroxide (non C—C initiator), having a one-hour half-life decomposition temperature from 100° C. to 159° C.

Combination of C—C and non-C—C Free Radical Initiators

The C—C free radical initiator and non-C—C free radical initiator are typically present in the process of this invention at a C—C initiator to non-C—C initiator weight ratio from 0.10 to 0.60, more typically from 0.20 to 0.50 and even more typically from 0.30 to 0.40. In one embodiment the total amount of free radical initiator used in the practice of this invention, i.e., the combined amount of all C—C free radical initiators and all non-C—C free radical initiators, is greater than, or equal to, 0.002 grams per kilogram (g/kg), further greater than 0.01 g/kg, further greater than 0.016 g/kg, further greater than 0.02 g/kg, of the ethylene-based polymer subjected to the thermal treatment and contacted with the free radical initiators of (A) and (B) above. While the only limitation on the maximum combined amount of all C—C free radical initiators and all non-C—C free radical initiators used in the practice of this invention is a function of process economics and efficiency, typically the maximum combined amount of C—C and non-C—C initiators used in the practice of this invention does not exceed 2 g/kg, more typically does not exceed 0.2 g/kg and even more typically does not exceed 0.1 g/kg, of the ethylene-based polymer subjected to the thermal treatment and contacted with the free radical initiators of (A) and (B) above.

Process

The invention provides a process. In one embodiment, the invention provides a process for increasing the melt strength of an ethylene-based polymer, particularly a linear low density polyethylene (LLDPE), the process including contacting under thermal treatment conditions, typically in an extruder, the ethylene-based polymer, e.g., LLDPE, with a combination of (i) one or more C—C free radical initiators, and (ii) one or more non-C—C free radical initiators. "Under thermal treatment conditions" and like terms mean at a temperature and pressure and for a sufficient period of time to increase the melt strength of the ethylene-based polymer by at least 15%, preferably in the range from 15 to 50%, as compared to the same or substantially similar resin which has not been reacted with a combination of the C—C and non-C—C free radical initiators.

In one embodiment, the second composition exhibits an increase in melt strength at 190° C. which is at least 15% greater than the melt strength of the first composition. All individual values and subranges are included herein and disclosed herein; for example the increase in melt strength can be from a lower limit of 15, 30, 35, 40 or 45% greater than the melt strength of the polyethylene resin in the absence of the combination of C—C and non-C—C free radical initiators.

The ethylene-based polymers of the first composition need to be subjected to an elevated temperature for a sufficient period of time so that the desired increase in melt strength occurs. The temperature is generally above the softening point of the polymers. In a preferred embodiment of the process of the present invention, a temperature range lower than 280° C., particularly from about 160° C. to 280° C. is employed. In a particularly preferred process variant, the temperature range from about 200° C. to 270° C. is employed. Typically a positive pressure, i.e., above atmospheric pressure, is employed, e.g., that pressure that is typically associated with the operation of an extruder processing an ethylene-based polymer. The period of time necessary for the increase in melt strength can vary as a function of the temperature, the amount of initiators to be degraded and the type of, for example, extruder used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 30 seconds, 1 minute, 5 minutes, 15, minutes or 25 minutes to an upper limit of 45 seconds, 3 minutes, 8 minutes, 18 minutes, 23 minutes or 30 minutes. For example, the time can be in the range of from 10 seconds to 30 minutes, or in the alternative, the time can be in the range of from 20 seconds to 20 minutes, or in the alternative, the time can be in the range of from 10 seconds to 15 minutes, or in the alternative, the time can be in the range of from 15 minutes to 30 minutes.

The process of this invention can be carried out in all customary mixing machines in which the ethylene-based polymer of the first composition is melted and mixed with the initiators. Suitable machines are known to those skilled in the art. They are predominantly mixers, kneaders and extruders. The C—C free radical initiators and non-C—C free radical initiators can be added to the ethylene-based polymer in any order or simultaneously. In one embodiment the C—C free radical initiators and non-C—C free radical initiators are first formulated into a masterbatch using any suitable carrier resin, typically the same ethylene-based polymer that will be the subject of the melt strength increase.

The process is preferably carried out in an extruder by introducing the initiators during processing. Particularly preferred processing machines are single-screw extruders, contra rotating and co rotating twin-screw extruders, planetary-gear extruders, ring extruders or co-kneaders. It is also possible to use processing machines provided with at least one gas removal compartment to which a vacuum can be applied. Suitable extruders and kneaders are described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm. It is also possible to first prepare a concentrated mixture of the initiators in a carrier polyethylene resin, preferably at 1000 to 10000 ppm, and then introduce this concentrate, or "masterbatch", via an extruder into a melted polyethylene resin using a static mixer to blend the two materials, preferably at 1 to 20 wt % of the concentrate in the melted resin. The concentrate can be processed in an extruder, preferably at temperatures from 180 to 240° C. The temperatures in the static mixer can range from 200 to 280° C., with a residence time in the mixer ranging from 1 to 10 minutes.

The maximum throughput is dependent on the screw diameter, the rotational speed and the driving force. The process of the present invention can also be carried out at a level lower than maximum throughput by varying the parameters mentioned or employing weighing machines delivering dosage amounts. Additives can be premixed or added individually, and they can be included within a masterbatch.

The process of this invention reduces the formation of gels as compared to a process operated under like conditions in all aspects except for the presence of a C—C free radical initiator. For example, the number of gels formed during the reactive extrusion of an ethylene-based polymer, e.g., LLDPE, in which a combination of C—C free radical initiator and non-C—C free radical initiator is used to initiate crosslinking of the polymer is less, typically a gel content or GI1200 of less than or equal to 40, or less than or equal to 20, or less than or equal to 10, or less than or equal to 5. While not being bound to theory, apparently the C—C free radical initiator acts as a suppressant to the non-C—C free radical initiator during the early stages of the reaction which allows for a more complete distribution of both initiators within the polymer before either initiates the crosslinking reaction.

Ethylene-Based Polymer

Any ethylene-based polymer having a density, as determined according to ASTM D792, in the range of from 0.865 g/cm$^3$ to 0.97 g/cm$^3$, and a melt index, $I_2$, as determined according to ASTM D1238 (2.16 kg, 190 C.), in the range of from 0.01 g/10 min to 100 g/10 min can be used as the first ethylene-based polymer of the first composition of this invention.

The ethylene-based polymer of the first composition can be a homopolymer of ethylene or a copolymer of ethylene and a minor (less than 50 wt %, or less than 40 wt %, or less than 30 wt %, or less than 20 wt %, or less than 10 wt %, or less than 5 wt %) amount of one or more alpha-olefins of 3 to 20 carbon atoms, preferably of 3 to 12 carbon atoms and more preferably 3 to 8 carbon atoms, and, optionally, a diene or a mixture or blend of such homopolymers and copolymers. The mixture can be either an in situ blend or a post-reactor (or mechanical) blend. Exemplary alpha-olefins include propylene, 1-butene, 1-hexene, 4-methyl-1-pentene and 1-octene.

The first ethylene-based polymer of the first composition can be homogeneous or heterogeneous. Homogeneous ethylene-based polymers typically have a polydispersity (Mw/Mn) before thermal treatment and contact with the free radical initiators of about 1.5 to about 3.5, an essentially uniform comonomer distribution, and a single, relatively low melting point as measured by differential scanning calorimetry (DSC). The heterogeneous ethylene-based polymers typically have a polydispersity greater than 3.5 and lack a uniform comonomer distribution. Mw is weight average molecular weight, and Mn is number average molecular weight.

In one embodiment the first ethylene-based polymer of the first composition has a density from 0.870 to 0.965 g/cc and an $I_2$ from 0.1 to 25 g/10 min. All individual values and subranges from 0.870 to 0.965 g/cc are included herein and disclosed herein; for example, the density of the first ethylene-based polymer can be from a lower limit of 0.87, 0.89, 0.91, 0.93, or 0.95 g/cc to an upper limit of 0.88, 0.9, 0.92, 0.94 or 0.965 g/cc. For example, the first ethylene-based polymer density may be in the range from 0.870 to 0.965 g/cc, or in the alternative, the first ethylene-based polymer density may be in the range from 0.9 to 0.965 g/cc, or in the alternative, the first ethylene-based polymer density may be in the range from 0.870 to 0.9 g/cc, or in the alternative, the first ethylene-based polymer density may be in the range from 0.885 to 0.945 g/cc. All individual values and subranges of an $I_2$ from 0.1 to 25 g/10 min are included herein and disclosed herein; for example the $I_2$ of the first ethylene-based polymer can be from a lower limit of 0.1, 1, 5, 10, 15, or 20 g/10 min to an upper limit of 0.5, 3, 8, 13, 18, 21 or 25 g/10 min. For example, the $I_2$ of the first ethylene-based polymer may be in the range from 0.1 to 25 g/10 min, or in the alternative, the $I_2$ of the first ethylene-based polymer may be in the range from 7 to 25 g/10 min, or in the alternative, the $I_2$ of the first ethylene-based polymer may be in the range from 0.1 to 10 g/10 min, or in the alternative, the $I_2$ of the first ethylene-based polymer may be in the range from 5 to 15 g/10 min. In a particular embodiment, the first ethylene-based polymer has a density from 0.915 to 0.934 g/cc and an $I_2$ from 0.1 to 20 g/10 min.

In another particular embodiment, the first ethylene-based polymer of the first composition has an $I_{21}$ from 1 to 100 g/10 min and a density from 0.945 to 0.967 g/cc. All individual values and subranges of an $I_{21}$ from 1 to 100 g/10 min are included herein and disclosed herein; for example, the $I_{21}$ can be from a lower limit of 1, 10, 20, 30, 40, 50, 60, 70 80 or 90 g10 min to an upper limit of 5, 15, 25, 35, 45, 55, 65, 75, 95 or 100 g/10 min. For example, the $I_{21}$ of the first ethylene-based polymer may be in the range from 1 to 100 g/10 min, or in the alternative, the $I_{21}$ of the first ethylene-based polymer may be in the range from 1 to 50 g/10 min, or in the alternative, the $I_{21}$ of the first ethylene-based polymer may be in the range from 50 to 100 g/10 min, or in the alternative, the $I_{21}$ of the first ethylene-based polymer may be in the range from 25 to 80 g/10 min, or in the alternative, the $I_{21}$ of the first ethylene-based polymer may be in the range from 15 to 75 g/10 min. All individual values and subranges of the density from 0.945 to 0.967 g/cc are included herein and disclosed herein; for example, the density of the first ethylene-based polymer may be from a lower limit of 0.945, 0.955, or 0.965 g/cc to an upper limit of 0.95, 0.96 or 0.967 g/cc.

The first ethylene-based polymer of the first composition may be made by any acceptable process, including for example, gas phase, slurry, or solution polymerization processes.

The present polymeric composition may comprise two or more embodiments disclosed herein.

Antioxidants

The first composition of this invention can comprise primary and secondary antioxidants. Primary antioxidants are antioxidants used to protect the finished product. These antioxidants are typically phenolic based (e.g., hindered phenols). Secondary antioxidants are antioxidants used to protect the polymer during processing. These antioxidants are typically phosphites and thioesters. In the context of this invention, examples of primary antioxidants include, but are not limited to, IRGANOX™ 1010 (pentaerythritol tetrakis (3-(3,5-di-tert-butyl-4-hydroxyphenyl)propionate), and IRGANOX™ 1076 (octadecyl 3,5-di-(tert)-butyl-4-hydroxyhydrocinnamate), both available from BASF. In the context of this invention, examples of secondary antioxidants include, but are not limited to, IRGAFOS™ 168 (tris(2,4-di-tert-butylphenyl) phosphite) and IRGAFOS™ 126 (a phosphite antioxidant), both available from BASF, and SONGNOX™ DLTDP and DSTDP (thioester antioxidants) both available from Vanderbilt Chemicals. In one embodiment and a preferred embodiment, the first composition does not comprise a primary antioxidant. In one embodiment, the first composition of this invention comprises greater than zero but less than 50, or 40, or 30, or 20, or 10, or 5, or 3, or 2 or 1 parts per million (ppm) of a primary antioxidant. In one embodiment, the first composition of this invention comprises a secondary antioxidant. In one embodiment, the first composition of this invention comprises at least one of a phosphite antioxidant or a thioester antioxidant. In one embodiment, the first composition of this invention comprises both a primary and a secondary antioxidant.

The first composition of this invention optionally comprises from 500 to 2,000 ppm secondary antioxidant based on the total polymeric composition weight. Secondary antioxidants prevent formation of additional free radicals by decomposing the peroxide into thermally stable, non-radical, non-reactive products by means of an efficient alternative to thermolysis and generation of free radicals. All individual values and subranges from 500 to 2,000 ppm are included herein and disclosed herein; for example, the amount of secondary antioxidant can be from a lower limit of 500, 700, 900, 1100, 1300, 1500, 1700 or 1900 ppm to an upper limit of 600, 800, 1000, 1200, 1400, 1600, 1800 or 2000 ppm. For example, when present, the secondary antioxidant may be present in an amount from 500 to 2,000 ppm, or in the alternative, the secondary antioxidant may be present in an amount from 1,250 to 2,000 ppm, or in the alternative, the secondary antioxidant may be present in an amount from 500 to 1,250 ppm, or in the alternative, the secondary antioxidant may be present in an amount from 750 to 1,500 ppm.

In one embodiment, the first composition comprises from greater than 0 to 10 ppm of the hindered phenol antioxidant, based on the weight of the first composition. In a further embodiment, the hindered phenol is selected from IRGANOX™ 1010 (pentaerythritol tetrakis(3-(3,5-di-tert-butyl-4-hydroxyphenyl)propionate), and IRGANOX™ 1076 (octadecyl 3,5-di-(tert)-butyl-4-hydroxyhydrocinnamate), both available from BASF.

In one embodiment, the second composition does not contain a hindered phenol antioxidant.

Articles of Manufacture

The second composition comprising the modified ethylene-based polymer can be used to manufacture, among other things, various extruded and molded articles. Examples of such articles include film, coatings, wire and cable coverings, sheets, pipes, blow-molded and injection molded parts for the automotive and consumer products industries, and the like.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc., excepting those that are not essential to the performance, operability or the like of the composition, process, etc. The term "consisting of" excludes from a composition, process, etc., any component, step, etc., not specifically disclosed. The term "or", unless stated otherwise, refers to the disclosed members individually as well as in any combination.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

"Modified ethylene-based polymer" and like terms mean an ethylene-based polymer that has been reacted with a carbon-carbon (C—C) free radical initiator and a non-carbon-carbon (non-C—C) free radical initiator.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

"Hydrocarbyl," and like terms, refer to a radical consisting of carbon and hydrogen atoms. Nonlimiting examples of hydrocarbyl radicals include alkyl (straight chain, branched or cyclic), aryl (e.g., phenyl, naphthyl, anthracenyl, biphenyl), aralkyl (e.g., benzyl), and the like.

"Aliphatic hydrocarbon" and like terms mean a branched or unbranched or cyclic, saturated or unsaturated, hydrocarbon radical. Nonlimiting examples of suitable aliphatic radicals include methyl, ethyl, n-propyl, i-propyl, 2-propenyl (or allyl), vinyl, n-butyl, t-butyl, i-butyl (or 2-methylpropyl), cyclopentyl, cyclohexyl, and the like. In one embodiment, the aliphatic radicals are alkyl radicals of 1 to 24 carbon atoms.

"Aryl" and like terms mean an aromatic radical which may be a single aromatic ring or multiple aromatic rings which are fused together, linked covalently, or linked to a common group such as a methylene or ethylene moiety. Nonlimiting examples of aromatic ring(s) include phenyl, naphthyl, anthracenyl, biphenyl, among others. In one embodiment, the aryl radicals typically comprise 6 to 20 carbon atoms.

Test Methods

Density of the resins is measured according to ASTM D792.

Melt Index, $I_2$, is measured according to ASTM D1238 (2.16 kg, 190° C.). Melt index, $I_{10}$, is measured according to ASTM D1238 (10 kg, 190° C.).

Melt strength measurements are conducted on a Göettfert Rheotens 71.97 (Göettfert Inc.; Rock Hill, S.C.), attached to a Göettfert Rheotester 2000 capillary rheometer. The melted sample (about 25 to 30 grams) is fed with a Göettfert Rheotester 2000 capillary rheometer, equipped with a flat entrance angle (180 degrees) of length of 30 millimeters (mm), diameter of 2.0 mm, and an aspect ratio (length/diameter) of 15. After equilibrating the samples at 190° C. for 10 minutes, the piston is run at a constant piston speed of 0.265 mm/second. The standard test temperature is 190° C. The sample is drawn uniaxially to a set of accelerating nips, located 100 mm below the die, with an acceleration of 2.4 millimeters per second squared ($mm/s^2$). The tensile force is recorded as a function of the take-up speed of the nip rolls. Melt strength is reported as the plateau force in centiNewtons (cN) before the strand broke. The following conditions are used in the melt strength measurements: plunger speed=0.265 mm/second; wheel acceleration=2.4 $mm/s^2$; capillary diameter=2.0 mm; capillary length=30 mm; and barrel diameter=12 mm.

Molecular Weight Distribution

The molecular weight distributions of the ethylene polymers are determined by gel permeation chromatography (GPC). The chromatographic system consists of a Polymer Laboratories (Now a part of Agilent Technologies, CA, US) PL 220 series high temperature gel permeation chromatograph with refractive index detection. Data collection is performed using GPCOne software from PolymerChar (Valencia, Spain). The system is equipped with an on-line solvent degas device from Agilent Technologies.

Both the carousel compartment and the column compartment are operated at 150° C. The columns used are 3 Agilent Technologies "Polymer Laboratories Mixed B" 30 cm 10-micron columns and a 10-um pre-column. The chromatographic solvent used is 1,2,4 trichlorobenzene and contained 200 ppm of butylated hydroxytoluene (BHT). The solvent source is nitrogen sparged. The injection volume used is 200 microliters and the flow rate is 1.0 milliliters/minute.

The samples are prepared at a concentration of 0.1 grams (g) of polymer in 50 milliliters (ml) of solvent. The chromatographic solvent and the sample preparation solvent contains 200 micrograms per gram (μg/g) of butylated hydroxytoluene (BHT). Both solvent sources are nitrogen sparged. Polyethylene samples are stirred gently at 160° C. for 4 hours. The injection volume used is 200 microliters (μl), and the flow rate is 1 milliliters per minute (ml/min).

Calibration of the GPC column set is performed with 21 narrow molecular weight distribution polystyrene standards, with molecular weights ranging from 580 to 8,400,000 grams per mole (g/mol), which are arranged in 6 "cocktail" mixtures with at least a decade of separation between individual molecular weights. The standards are purchased from Polymer Laboratories. The polystyrene standards are prepared at 0.025 g in 50 ml of solvent for molecular weights equal to, or greater than, 1,000,000 g/mol, and 0.05 g in 50 ml of solvent for molecular weights less than 1,000,000 g/mol. The polystyrene standards are dissolved at 80° C. with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, *J Polym. Sci., Polym. Let.,* 6, 621 (1968)):

$$M_{polyethylene} = A \times (M_{polystyrene})^B,$$

where M is the molecular weight, A has a value of 0.4316 and B is equal to 1.0.

Dynamic Mechanical Spectroscopy (DMS)

Resins are compression-molded into "3 mm thick×1 inch" circular plaques at 350° F. (177° C.), for five minutes, under 1500 psi (10.3 MPa) pressure, in air. The sample is then taken out of the press, and placed on a counter to cool. A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm", the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 radians per second (rad/s). The strain amplitude is constant at 10%. The complex viscosity η*, tan (δ) or tan delta, viscosity at 0.1 rad/s (V0.1), the viscosity at 100 rad/s (V100), and the viscosity ratio (V0.1/V100) are calculated from these data.

Differential Scanning Calorimetry (DSC) of Polymer

DSC can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 milligram (mg), 6 mm diameter specimen is extracted from the cooled polymer, weighed, placed in a light aluminum pan (about 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram (J/g)), and the calculated percent (%) crystallinity for polyethylene samples using: % Crystallinity=(($H_f$)/(292 J/g))×100.

The heat of fusion ($H_f$) and the peak melting temperature are reported from the second heat curve. Peak crystallization temperature is determined from the cooling curve.

Gel Content Measurement

Extruder: Model OCS ME 19 available from OCS Optical Control Systems GmbH Wullener Feld 36, 58454 Witten, Germany or equivalent. Parameter Mixing Screw L/D 25/1. Coating Chrome Compression ratio 3/1. Feed Zone 10D. Transition Zone 3D. Metering Zone 9D. Mixing Zone 3D.

Cast Film Die: ribbon die, 150×0.5 mm, available from OCS Optical Control Systems GmbH, or equivalent.

Air Knife: OCS air knife to pin the film on the chill roll, available from OCS Optical Control Systems GmbH, or equivalent.

Cast Film Chill Rolls and Winding Unit: OCS Model CR-8, available for OCS Optical Control Systems GmbH, or equivalent. See Table A.

TABLE A

| Extruder Operating Conditions | | |
| --- | --- | --- |
| Throat Set Temperature | ° C. | 25 ± 3 |
| Zone 1 Set Temperature | ° C. | 195 ± 5 |
| Zone 2 Temperature | ° C. | 215 ± 5 |
| Zone 3 Set Temperature | ° C. | 235 ± 5 |
| Clamp Ring Set Temperature | ° C. | 235 ± 5 |
| Adapter Set Temperature | ° C. | 235 ± 5 |
| Die Set Temperature | ° C. | 235 ± 5 |
| Screw Type | | Mixing |
| Screw Speed | RPM | 70 ± 2 |
| Chill Speed | m/min. | 3 ± 1 |
| Chill Temp. | ° C. | 40 ± 2 |
| Tension Speed | m/min. | 8 ± 2 |
| Winder Torque | N | 4 ± 1 |
| Lab Temperature | ° C. | 23 ± 2 |
| Lab Humidity | % | <70 |

TABLE A-continued

| Extruder Operating Conditions | | | |
|---|---|---|---|
| Width | mm | 125 ± 18 | |
| Thickness | μm | 76 ± 5 | |

Gel Counter: OCS FS-3 line gel counter consisting of a lighting unit, a CCD detector and an image processor with the Gel counter software version 3.65e 1991-1999, available from OCS Optical Control Systems GmbH, or equivalent.

GI200: One analysis inspects 50 parcels, where a parcel is defined as 24.6 cm³ of film, or 0.324 m² for a film thickness of 76 μm.

GI200 is defined as the sum of the areas of all gels with diameter >200 μm, averaged over 50 parcels The diameter of a gel is determined as the diameter of a circle having equivalent area.

Initiator One-Hour Half-Life Determination

Initiator one hour half-life decomposition temperature is determined by differential scanning calorimetry-thermal activity monitoring (DSC-TAM) of a dilute solution of the initiator in monochlorobenzene. Kinetic data of the decomposition of hydroperoxides in monochlorobenzene are determined titrimetrically. The half-life can be calculated by the Arrhenius equation:

$$k_d = A \cdot e^{-Ea/RT} \text{ and } t_{1/2} = \ln 2/k_d,$$

where $k_d$ is the rate constant for initiator dissociation in $s^{-1}$; A is the Arrhenius frequency factor in $s^{-1}$; Ea is the activation energy for the initiator dissociation in J/mole; R is 8.3142 J/mole K; T is temperature in K (Kelvin); and $t_{1/2}$ is half-life in seconds (s).

Antioxidant Concentration Determination

Determination of IRGAFOS™ 168 and oxidized IRGAFOS™ 168 in polyethylene is performed using total dissolution methodology (TDM). This methodology involves dissolution of 1 g of solid in 25 ml of o-xylene at 130° C. for 30 min followed by precipitation with cooling and the addition of 50 ml of methanol. After the precipitation, the extract is filtered using a syringe filter into an autosampler vial for analysis by reversed phase liquid chromatography using the conditions summarized below:

Column: Zorbax Eclipse XDB-C8, 5 μm particle, 4.6× 12.5 mm guard coupled to a Zorbax, Eclipse XDB-C8, 3.5 μm particle, 4.6×50 mm column using an Agilent guard column kit;
Column Oven: 50° C.;
Detection: UV absorbance at 210 nanometers (nm);
Gradient: Solvent A: 50/50 water/acetonitrile, and

TABLE B

| | Solvent B: Acetonitrile | | |
|---|---|---|---|
| Time (min) | Flow (mL/min) | % A | % B |
| 0.0 | 1.9 | 50 | 50 |
| 2.00 | 1.9 | 0 | 100 |
| 6.00 | 1.9 | 0 | 100 |

Data acquisition time: 8 min;
Post Run Time: 2 min at 50/50 A/B;
Total run time: 10 min with equilibration time;
Injection: 10 μL; and
Data System: Agilent EZChrom Elite.

The concentration of the components are calculated using an external standard calibration procedure.

The following examples illustrate the present invention but are not intended to limit the scope of the invention.

EXAMPLES

Resins and Reagents

Resin A DOWLEX™ 2045B, commercially available from The Dow Chemical Company) is an ethylene/octene copolymer having melt index of 1.0 g/10 min (at 190° C., 2.16 kg ASTM D-1238) and a density 0.920 g/cm³ (ASTM D792). Resin A contains a secondary antioxidant (1,000 ppm amount).

Resin B (LDPE 219 M, commercially available from The Dow Chemical Company) is a homopolymer ethylene resin having a melt index of 2.0 g/10 min (at 190° C., 2.16 kg ASTM D-1238) and a density of 0.922 g/cm³ (ASTM D792).

Synthesis of C—C Free Radical Initiator (DiBuDPH)

Representative preparation of tertiary alcohols: Inside a nitrogen-filled glovebox, ethylmagnesium chloride solution (3.0 M in ether, 32.05 mL, 96.2 millimole (mmol)) is placed in a jar. One hundred (100) ml of sparged & dried THF is then added to the jar followed by 0.6 M LaCl₃-2(LiCl) in THF (12.3 mL, 7.40 mmol) dropwise to the magnesium solution (a precipitate may form depending on the choice of magnesium reagent). Once addition is complete, stir for 30 minutes at room temperature (about 23° C.). Add isovalerophenone (12.0 g, 74.0 mmol) dropwise with stirring while cooling the reaction vessel with a fan. After 1 hour, the mixture is removed from the nitrogen atmosphere, cooled in an ice bath, and the reaction quenched via slow addition of cold aqueous NH₄Cl. The product is extracted with ether, and the organic layers are washed with aqueous sodium bicarbonate, brine, and dried with MgSO₄. After removal of the volatiles, NMR is recorded in C6D6.

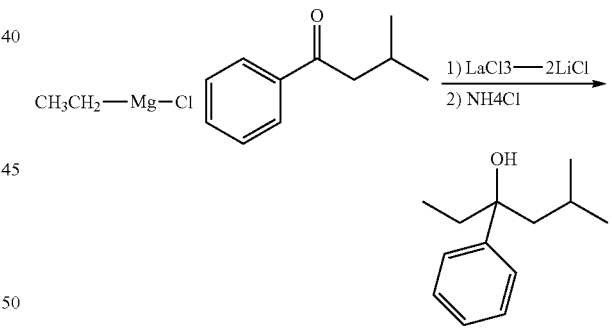

Representative preparation of diphenyl ethane structures: Inside a nitrogen-filled glovebox, TiCl₃ (5.75 g, 37.3 mmol) is added to a jar. To this is added 70 ml of anhydrous 1,2-dimethoxyethane. As a 2.0 M solution in THF, lithium aluminum hydride (6.2 mL, 12.4 mmol) is added slowly over 20 minutes while cooling the reaction vessel with a fan, Heat and gas evolution are noted. After stirring for 20 minutes at room temperature (about 23° C.), 2-methyl-4-phenyl-4-hexanol (2.39 g, 12.4 mmol) is added dropwise. After addition, the mixture is heated to 65° C. After 3 hours, the mixture is removed from the nitrogen atmosphere, cooled in an ice bath, and the reaction quenched via slow addition of cold aqueous NH₄Cl. The product is extracted with ether, and the organic layers are washed with aqueous sodium bicarbonate, brine, and dried with MgSO₄. After removal of the volatiles, NMR is recorded in C6D6. The product has a decomposition temperature of 139° C.

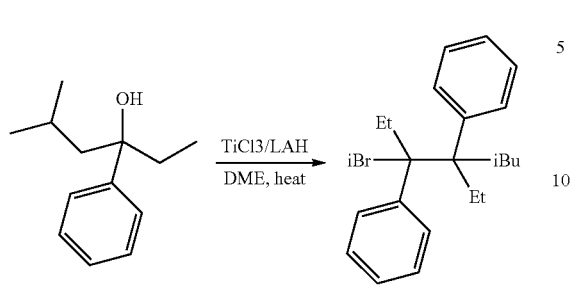

Synthesis of C—C Free Radical Initiators: DEDPH

Representative preparation of tertiary alcohols: Inside a nitrogen-filled glovebox, ethylmagnesium chloride solution (3.0 M in ether, 32.05 mL, 96.2 millimole (mmol)) is placed in a jar. One hundred (100) ml of sparged & dried THF is then added to the jar followed by 0.6 M LaCl$_3$-2(LiCl) in THF (12.3 mL, 7.40 mmol) dropwise to the magnesium solution (a precipitate may form depending on the choice of magnesium reagent). Once addition is complete, stir for 30 minutes at room temperature (about 23° C.). Add propiophenone (9.9 g, 74.0 mmol) dropwise with stirring while cooling the reaction vessel with a fan. After 1 hour, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6.

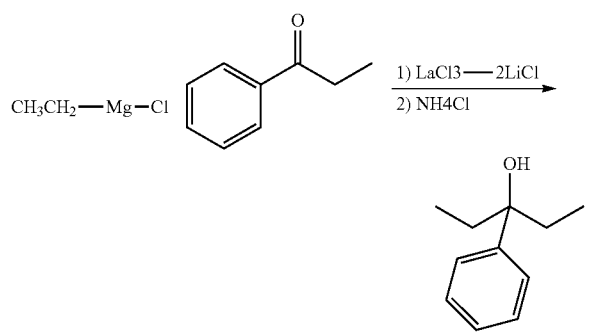

Representative preparation of diphenyl ethane structures: Inside a nitrogen-filled glovebox, TiCl$_3$ (5.75 g, 37.3 mmol) is added to a jar. To this is added 70 ml of anhydrous 1,2-dimethoxyethane. As a 2.0 M solution in THF, lithium aluminum hydride (6.2 mL, 12.4 mmol) is added slowly over 20 minutes while cooling the reaction vessel with a fan. Heat and gas evolution are noted. After stirring for 20 minutes at room temperature (about 23° C.), 3-phenyl-3-pentanol (2.03 g, 12.4 mmol) is added dropwise. After addition, the mixture is heated to 65° C. After 3 hours, the mixture is removed from the nitrogen atmosphere, cooled in an ice bath, and the reaction quenched via slow addition of cold aqueous NH$_4$Cl. The product is extracted with ether, and the organic layers are washed with aqueous sodium bicarbonate, brine, and dried with MgSO$_4$. After removal of the volatiles, NMR is recorded in C6D6. The product (DEDPH) has a decomposition temperature of 202° C.

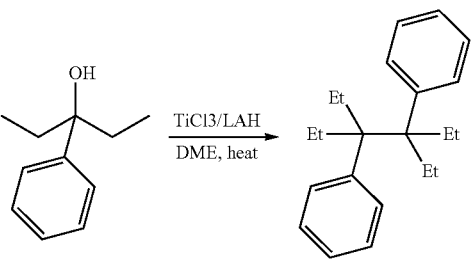

Procedure: Producing Masterbatches

Two masterbatches are prepared with Resin B as the carrier resin and either (a) 2,500 ppm of CGX CR 946 (for Comparative Example and Inventive Examples), or (b) 1200 ppm of DEDPH (for Inventive Examples). Resin B and either CGX CR 946 or DEDPH are compounded in a 30 mm co-rotating, intermeshing COPERION WERNER-PFLEI-DERER ZSK-30 (ZSK-30) twin screw extruder to form a masterbatch. The ZSK-30 has ten barrel sections with an overall length of 960 mm and a 32 length to diameter ratio (L/D). A two-hole strand die is used without a breaker plate or screen pack. The extruder consists of a DC motor, connected to a gear box by V-belts. The 15 Hp motor is powered by a GE adjustable speed drive located in a control cabinet. The control range of the screw shaft speed is 1:10. The maximum screw shaft speed is 500 revolutions per minute (rpm). A pressure transducer is positioned in front of the die to measure die pressure.

The extruder has eight heated/cooled barrel sections along with a 30 mm spacer, which make up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed. The elements are held together radially by keys and keyways and axially by a screwed-in screw tip. The screw shafts are connected to the gear-shafts by couplings and can easily be pulled out of the screw barrel for dismantling.

A Conair pelletizer which is a 220 volt variable speed, solid cutter unit is used to pelletize the blends. The variable speed motor drives a solid machined cutting wheel, which in turn drives a fixed metal roller. A movable rubber roller pressed against the fixed roller helps pull the strands by friction into the cutting wheel. The tension on the movable roller may be adjusted as necessary.

The temperatures are set in the feed zone, 4 zones in the extruder, and the die as:

Feed: 80° C.

Zone 1: 160° C.

Zone 2: 180° C.

Zone 3: 185° C.

Zone 4: 190° C.

Die: 210° C.

The screw shaft speed is set at 275 rpm resulting in an output rate of 52 lb/h.

Example Resins

Control Example 1 is Resin A.

Control Example 2 is made from Resin A (at 120 lb/h) and Resin B (at 4.2 lb/h). Control Example 2 consists of 96.6 wt % Resin A and 3.4 wt % Resin B. Resin B is the carrier for the masterbatches as described in the Procedure: Producing Masterbatches.

Comparative Example 1 is Resin A compounded at 120 pounds per hour (lb/h) and resin B at 4.2 lb/h, where resin B is first compounded with 2,500 parts per million (ppm) CGX (CGX CR946 (non C—C free radical initiator), an alkoxyamine derivative which is commercially available from BASF), resulting in a resin with 51 ppm CGX, 96.6 wt % Resin A, and 3.4 wt % Resin B.

Inventive Example 1 is a blend of Resin A (at 120 lb/h) and a dry-blended resin (at 4.2 lb/h) made of 60 wt % Resin B, where Resin B is first compounded with 2,500 ppm CGX, and 40 wt % of Resin B, where Resin B is compounded with 1,200 ppm of DEDPH, resulting in a resin with 51 ppm CGX, 16 ppm DEDPH, 96.6 wt % Resin A, and 3.4 wt % Resin B.

Inventive Example 2 is a blend of Resin A (at 120 lb/h) and a dry-blended resin (at 4.2 lb/h) made of 80 wt % Resin B, where Resin B is first compounded with 2,500 ppm CGX, and 20% of Resin B where resin B is compounded with 1,200 ppm of DEDPH, resulting in a resin with 68 ppm CGX, 22 ppm DEDPH, 96.6 wt % Resin A, and 3.4 wt % Resin B.

Each of the Control Examples, the Comparative Example and the Inventive Examples further contain the measured amount of IRGAFOS 168 (secondary antioxidant) shown in Tables 1-2, respectively. IRGAFOS 168 is tris(2,4-ditert-butylphenyl)phosphite, which is commercially available from BASF.

Preparation of Composition Containing the Modified Ethylene-Based Polymer

The appropriate masterbatch material is blended with Resin A using the following setup: the masterbatch is fed through a hopper into a Sterling 2½ inch single screw extruder which is used as the side arm conveyer with a rupture disc of 3200 psig (22 MPa). The four heating zones in the single screw extruder are set at 220° C.

Resin A is fed through another hopper into a Century-ZSK-40 extruder (37.13 length-to-diameter ratio extruder, a co-rotating, intermeshing, 40 mm twin screw extruder with 150 horsepower (hp) drive, 244 Armature amps (maximum), and 1200 screw rpm (maximum)). The nine heating zones in the extruder are set as follows: the first at 25° C., the second at 100° C., and the rest at 200° C.

The polymer melt pump is a MAAG 100 cubic centimeters per revolution (cc/rev) pump that conveyed the molten polymer from the extruder, and through the downstream equipment. It is powered by a 15 hp motor with a 20.55/1 reduction gear. The pump is equipped with a pressure transmitter and a 5200 psi (35.8 MPa) rupture disc on the inlet and outlet transition piece. There are heater zones on the melt pump and the inlet and outlet transition pieces which are set at 220° C.

The melt pump is attached to the extruder and the single screw extruder's flow enters the polymer stream through an injector from the single screw side arm extruder. The injector is a ¾ of an inch (1.9 centimeter (cm)) tubing protruding into the centerline of a pipe attached to the melt pump with a 3.1 inches (7.9 cm) internal diameter.

The polymer coming from the extruder is blended with the single screw extruder resin as it flowed through a static mixer with 18 KENICS™ mixing elements inside a pipe of 3.1 inch (7.9 cm) internal diameter. The mixing elements have a 1.3 length-to-diameter ratio. There are seven heating zones in the static mixer and are all set to 220° C.

The combined flow then flows through a GALA pelletizer system. The GALA is equipped with a 12 hole (2.36 mm diameter holes) GALA die with four of the holes plugged. The cutter has a four blade hub and operates at approximately 800 ppm. The water temperature in the pelletizer is kept at 30° C.

The residence time of the masterbatch in the side arm extruder is approximately 20 minutes and the residence time of the polymer in the static mixer is approximately 3 minutes.

Tables 1-2 report the results of Control Examples 1 and 2, Comparative Example 1 and Inventive Examples 1 and 2.

Inventive Example 1 as compared to Comparative Example 1 shows the effect of 16 ppm DEDPH, in particular by decreasing the gel content from 8.8 to 5.4. Inventive Example 2 shows that the DEDPH is also effective at even higher levels of CGX, which generally cause an increase in gel content. For Inventive Example 2, 68 ppm CGX and 22 ppm DEDPH, a lower MI is achieved of 0.55 MI, a higher melt strength of 7.8 cN and a lower gel content of 6.1 as compared to Comparative Example 1 with a 0.69 melt index, a 5.7 cN melt strength and a gel content of 8.8. Thus the DEDPH is shown to be an effective moderator of the CGX reaction, allowing a reduction in gels as compared to without the use of the DEDPH.

TABLE 1

Control Examples 1-2 and Comparative Example 1

|  | Control. Ex. 1 (reference polymer) | Control. Ex. 2 | Comparative. Ex. 1 (non-C-C) |
|---|---|---|---|
| % Resin A | 100 | 96.6 | 96.6 |
| % Resin B | 0 | 3.4 | 3.4 |
| CGX (ppm) | 0 | 0 | 51 |
| DEDPH (ppm) | 0 | 0 | NA |
| $I_2$ | 0.96 | 0.90 | 0.69 |
| $I_{10}/I_2$ | 7.85 | 8.43 | 9.32 |
| Density (g/cm$^3$) | 0.9212 | 0.9208 | 0.9206 |
| Melt Strength (cN) | 3.3 | 4.3 | 5.7 |
| Active IRGAFOS 168 (ppm) | 946 | 786 | 689 |
| Oxidized IRGAFOS 168 (ppm) | 47 | 208 | 262 |
| Total IRGAFOS 168 (ppm) | 992 | 993 | 951 |
| Gel Content or GI200 | 6.14 | 7.32 | 8.81 |
| Viscosity at 0.1 rad/s (Pa-s) | 8,360 | 9,007 | 12,811 |

TABLE 1-continued

Control Examples 1-2 and Comparative Example 1

| | Control. Ex. 1 (reference polymer) | Control. Ex. 2 | Comparative. Ex. 1 (non-C-C) |
|---|---|---|---|
| Viscosity at 1 rad/s (Pa-s) | 6,726 | 7,287 | 8,803 |
| Viscosity at 10 rad/s (Pa-s) | 4,128 | 4,372 | 4,624 |
| Viscosity at 100 rad/s (Pa-s) | 1,682 | 1,761 | 1,746 |
| Viscosity at 0.1/100 rad/s | 4.97 | 5.11 | 7.34 |
| Tan Delta at 0.1 rad/s | 10.88 | 7.63 | 4.39 |
| G* (Pa) at 0.1 rad/s | 836 | 901 | 1,249 |
| G* (Pa) at 1 rad/s | 6,726 | 7,287 | 8,234 |
| G* (Pa) at 10 rad/s | 41,283 | 43,716 | 39,412 |
| G* (Pa) at 100 rad/s | 168,200 | 176,100 | 122,270 |
| Phase Angle (Degrees) at 0.1 rad/s | 84.75 | 82.53 | 77.18 |
| Phase Angle (Degrees) at 1 rad/s | 76.59 | 75.51 | 69.28 |
| Phase Angle (Degrees) at 10 rad/s | 63.03 | 62.36 | 58.46 |
| Phase Angle (Degrees) at 100 rad/s | 46.51 | 46.25 | 44.46 |
| Mw (g/mol) | 119,509 | 121,586 | 122,123 |
| Mn (g/mol) | 31,571 | 30,106 | 30,545 |
| Mz (g/mol) | 331,796 | 359,068 | 363,820 |
| Mw/Mn | 3.79 | 4.04 | 4.00 |
| Mz/Mw | 2.78 | 2.95 | 2.98 |
| Melting Temperature Tm (° C.) | 123.8 | 123.0 | 122.5 |
| Melting Temperature Tm2 (° C.) | NA | NA | NA |
| Melting Temperature Tm3 (° C.) | NA | NA | NA |
| Heat of Fusion (J/g) | 155.4 | 141.3 | 145.8 |
| % Crystallinity | 53.2 | 48.4 | 49.9 |
| Crystallization Temperature Tc (° C.) | 107.8 | 109.5 | 110.3 |

TABLE 2

Inventive Examples 1-2

| | Inv. Ex. 1 | Inv. Ex. 2 |
|---|---|---|
| % Resin A | 96.6 | 96.6 |
| % Resin B | 3.4 | 3.4 |
| CGX (ppm) | 51 | 68 |
| DEDPH (ppm) | 16 | 22 |
| $I_2$ | 0.67 | 0.55 |
| $I_{10}/I_2$ | 9.35 | 10.98 |
| Density (g/cm³) | 0.9212 | 0.9211 |
| Melt Strength (cN) | 5.8 | 7.8 |
| % Melt Strength Increase vs. Comp. Ex. 1 | 76 | 136 |
| Active IRGAFOS 168 (ppm) | 699 | 652 |
| Oxidized IRGAFOS 168 (ppm) | 261 | 289 |
| Total IRGAFOS 168 (ppm) | 960 | 941 |
| Gel Content or GI200 | 5.35 | 6.12 |
| Viscosity at 0.1 rad/s (Pa-s) | 13,313 | 18,595 |
| Viscosity at 1 rad/s (Pa-s) | 9,031 | 10,786 |
| Viscosity at 10 rad/s (Pa-s) | 4,696 | 5,056 |
| Viscosity at 100 rad/s (Pa-s) | 1,761 | 1,792 |
| Viscosity at 0.1/100 rad/s | 7.56 | 10.38 |
| Tan Delta at 0.1 rad/s | 4.27 | 3.00 |
| G* (Pa) at 0.1 rad/s | 1,296 | 589 |
| G* (Pa) at 1 rad/s | 8,420 | 4,718 |
| G* (Pa) at 10 rad/s | 39,876 | 28,990 |
| G* (Pa) at 100 rad/s | 122,960 | 131,430 |
| Phase Angle (Degrees) at 0.1 rad/s | 76.81 | 71.54 |
| Phase Angle (Degrees) at 1 rad/s | 68.81 | 64.06 |
| Phase Angle (Degrees) at 10 rad/s | 58.12 | 55.01 |
| Phase Angle (Degrees) at 100 rad/s | 44.28 | 42.83 |
| Mw (g/mol) | 119,113 | 121,265 |
| Mn (g/mol) | 30,075 | 29,783 |
| Mz (g/mol) | 340,007 | 359,005 |
| Mw/Mn | 3.96 | 4.07 |
| Mz/Mw | 2.85 | 2.96 |
| Melting Temperature Tm (° C.) | 123.0 | 123.1 |
| Melting Temperature Tm2 (° C.) | NA | NA |
| Melting Temperature Tm3 (° C.) | NA | NA |
| Heat of Fusion (J/g) | 148.6 | 146.2 |
| % Crystallinity | 50.9 | 50.1 |
| Crystallization Temperature Tc (° C.) | 110.0 | 110.2 |

What is claimed is:

1. A process to form a second composition comprising a modified ethylene-based polymer the process comprising reacting at a temperature lower than 280° C. a first composition comprising a first ethylene-based polymer with at least the following:

(A) at least one carbon-carbon (C—C) free radical initiator of Structure I:

(Structure I)

wherein $R_1$, $R_2$, $R_3$, $R_4$, $R_5$ and $R_6$ are each, independently, hydrogen or a hydrocarbyl group; and wherein, optionally, two or more R groups ($R_1$, $R_2$, $R_3$, $R_4$, $R_5$ and $R_6$) form a ring structure; and with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and (B) at least one free radical initiator other than the carbon-carbon (C—C) free radical initiator of Structure I (a non-C—C free radical initiator); and (C) less than 10 ppm of a hindered phenol antioxidant, based on the weight of the first composition.

2. The process of claim 1 further comprising forming the second composition with a gel content less than or equal to 40 as determined by the GI200 test method, with a film thickness of 76±5 microns.

3. A process to form a second composition comprising a modified ethylene-based polymer the process comprising reacting at a temperature lower than 280° C. a first composition comprising a first ethylene-based polymer with at least the following:

(A) at least one carbon-carbon (C—C) free radical initiator of Structure I:

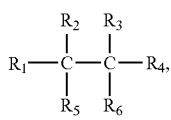
(Structure I)

wherein $R_1$, $R_2$, $R_3$, $R_4$, $R_5$ and $R_6$ are each, independently, hydrogen or a hydrocarbyl group; and
wherein, optionally, two or more R groups ($R_1$, $R_2$, $R_3$, $R_4$, $R_5$ and $R_6$) form a ring structure; and
with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms; and (B) at least one free radical initiator other than the carbon-carbon (C—C) free radical initiator of Structure I (a non-C—C free radical initiator).

4. The process of claim 3, in which the melt strength of the second composition is at least 15% greater than the melt strength of the first composition.

5. The process of claim 3, in which the second composition has a gel content less than or equal to 20 as determined by the GI200 test method, with a film thickness of 76±5 microns.

6. The process of claim 3, in which the first ethylene-based polymer has at least one of the following: (i) a density from 0.900 to 0.940 g/cc, or (ii) a melt strength of has at least 3.0 cN.

7. The process of claim 3, in which the first ethylene-based polymer is an ethylene/α-olefin copolymer.

8. The process of claim 7, in which the ethylene/α-olefin copolymer has a density from 0.900 to 0.940 g/cc.

9. The process of claim 3, in which the C—C free-radical initiator is of Structure II:

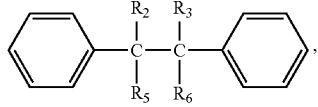
(Structure II)

wherein $R_2$, $R_3$, $R_5$ and $R_6$ are each, independently, hydrogen or a hydrocarbyl group; and
wherein, optionally, two or more R groups ($R_2$, $R_3$, $R_5$ and $R_6$) form a ring structure; and with the provisos that (i) at least one of $R_2$ and $R_5$ is a hydrocarbyl group of at least two carbon atoms, and (ii) at least one of $R_3$ and $R_6$ is a hydrocarbyl group of at least two carbon atoms.

10. The process of claim 3, in which the C—C free-radical initiator is selected from the group consisting of Structures III-VIII:

3,4-dimethyl-3,4-diphenyl hexane (Structure III)

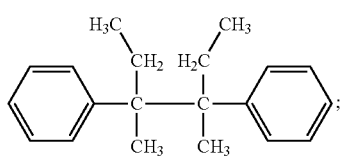
(Structure III)

3,4-diethyl-3,4-diphenyl hexane (Structure IV)

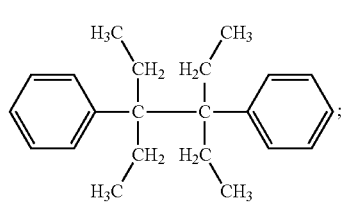
(Structure IV)

2,7-dimethyl-4,5diethyl-4,5-diphenyl octane (DBuDPH) (Structure V)

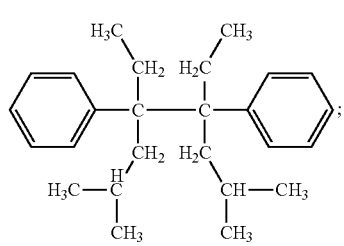
(Structure V)

3,4-dibenzyl-3,4-ditolyl hexane (DBnDTH) (Structure VI)

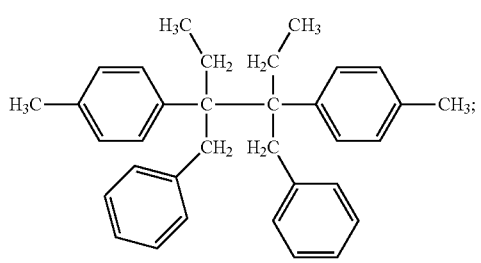
(Structure VI)

3,4-diethyl-3,4-di(dimethylphenyl) hexane (Structure VII)

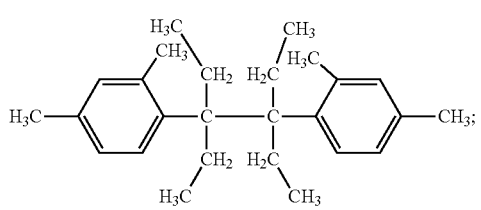
Structure VII and
and, 3,4-dibenzyl-34-diphenyl hexane (Structure VIII)

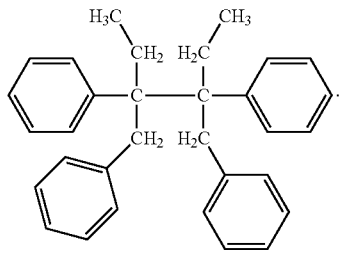

Structure VIII

11. The process of claim 3, in which the C—C free-radical initiator has a decomposition temperature of greater than or equal to (≥) 125° C. based on a DSC measurement.

12. The process of claim 3, in which at least one of the non-C—C free radical initiators of (B) is one of the following: an inorganic or organic peroxide, an azo compound, a sulfur compound, or a halogen compound.

13. The process of claim 3, in which at least one non-C—C free radical initiator of (B) is a sterically hindered hydroxylamine ester.

14. The process of claim 3, in which the C—C free radical initiator of (A) and non-C—C free radical initiator of (B) are present at a C—C initiator to non-C—C initiator weight ratio from 0.10 to 0.60.

15. The process of claim 3 further comprising a hindered phenol antioxidant.

16. The process of claim 3 further comprising forming the second composition with a gel content less than or equal to 40 as determined by the GI200 test method, with a film thickness of 76±5 microns.

17. The process of claim 16, in which the second composition has a melt strength of at least 3.0 cN.

18. The process of claim 3, wherein the process comprises the step reacting at a temperature from 200° C. to 270° C. the first composition with at least the (A) at least one carbon-carbon (C—C) free radical initiator of Structure I and the (B) at least one free radical initiator other than the carbon-carbon (C—C) free radical initiator of Structure I (a non-C—C free radical initiator).

19. The process of claim 3, wherein the process is carried out in an extruder at a rotational screw speed of 25 rpm to 300 rpm.

20. The process of claim 3, wherein the temperature of less than 280° C. is maintained for 10 seconds to 30 minutes.

* * * * *